(12) United States Patent
Vasten (10) Patent No.: US 8,521,623 B2
(45) Date of Patent: Aug. 27, 2013

(54) RETURN PAYMENT CARD PROCESS

(75) Inventor: Brett Vasten, Highlands Ranch, CO (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 12/690,254

(22) Filed: Jan. 20, 2010

(65) Prior Publication Data
US 2011/0055057 A1 Mar. 3, 2011

Related U.S. Application Data

(60) Provisional application No. 61/237,179, filed on Aug. 26, 2009.

(51) Int. Cl.
*G06Q 10/00* (2012.01)

(52) U.S. Cl.
USPC .................................. 705/30; 705/28; 705/41

(58) Field of Classification Search
USPC ....................................................... 705/28, 30
See application file for complete search history.

(56) References Cited

U.S. PATENT DOCUMENTS

| | | | |
|---|---|---|---|
| 6,826,548 B2 | 11/2004 | Hungerpiller et al. | |
| 7,172,112 B2 | 2/2007 | Bonalle et al. | |
| 7,850,075 B1 * | 12/2010 | Rosemore et al. | 235/380 |
| 2002/0143655 A1 * | 10/2002 | Elston et al. | 705/26 |
| 2005/0006453 A1 * | 1/2005 | Smith et al. | 235/375 |
| 2005/0149544 A1 * | 7/2005 | Bishop et al. | 707/101 |
| 2005/0218213 A1 * | 10/2005 | Rasnake et al. | 235/380 |
| 2005/0247777 A1 * | 11/2005 | Pitroda | 235/380 |
| 2006/0184386 A1 | 8/2006 | Merritt | |
| 2007/0045403 A1 * | 3/2007 | Slonecker, Jr. | 235/380 |
| 2007/0138299 A1 * | 6/2007 | Mitra | 235/492 |
| 2008/0044057 A1 | 2/2008 | Keller et al. | |
| 2008/0172316 A1 * | 7/2008 | Adams | 705/35 |
| 2008/0300895 A1 | 12/2008 | Monk | |
| 2008/0301011 A1 * | 12/2008 | Monk | 705/28 |
| 2009/0095809 A1 * | 4/2009 | Naccache | 235/380 |
| 2009/0240512 A1 * | 9/2009 | Prchal et al. | 705/1 |

OTHER PUBLICATIONS

"Expired Credit Card," Identity-Theft-Awarness.com (Feb. 18, 2008).*
Thomas, H., "Thousands Exposed to Danger of Identity Theft," EXPRESS, (Sep. 13, 2006).*
Unknown, "Programs to Ensure Accuracy of Voting Lists Making Strides," PR Newswire (Mar. 23, 2006).*
Gilgoff, Henry, "Washington Mutual Lauches MasterCard Gift Card," Newsday, 2005 ("WAMU").*
International Search Report for International Application No. PCT/US2010/046335 dated Apr. 28, 2011, 6 pages.

* cited by examiner

*Primary Examiner* — Ryan Zeender
*Assistant Examiner* — Kristie A Mahone
(74) *Attorney, Agent, or Firm* — Kilpatrick Townsend & Stockton LLP (57) ABSTRACT

A payment card returned as undeliverable is processed with a card administration system that responds to the return of the payment card by setting a "returned" indicator in a data record of a cardholder to whom the payment card was intended for delivery, and otherwise maintains the cardholder's account without change. A card handling system initiates destruction of the returned payment card and provides a replacement payment card to the cardholder if updated profile information of the cardholder is received within a predetermined time period, and closes the cardholder account and returns any funds in the cardholder account if no updated profile information of the cardholder is received within the predetermined time period.

20 Claims, 6 Drawing Sheets

Undeliverable Cards

Undeliverable cards will be held in returned status until the Destroy date. Once an undeliverable card is destroyed, the cardholder account will be closed

Report Data
| | |
|---|---|
| Client: | PRC-### - Sample Financial |
| Card Program: | Payroll Card |
| Location: | Employer Location 123 |
| Run Date: | 1/14/2009 17:04 |
| Page: | 1 of 1 |

| Cardholder Name | Returned Card Number | Current Card Number | Date Returned | Destroy Date | Location | Cardholder e-mail | Cardholder Phone |
|---|---|---|---|---|---|---|---|
| Blow, Joe | 4754 00** **** 1234 | 4754 00** **** 1234 | 11-03-2008 | 12-04-2008 | Location 1 | jblow@mail.com | 303 556 2564 |
| Smith, Jim | 4754 00** **** 1234 | 4754 00** **** 1234 | 11-12-2008 | 12-15-2008 | Location 2 | jsmith@mail.com | 230 555 5555 |
| Evans, Janet | 4754 00** **** 1234 | 4754 00** **** 1234 | 11-03-2008 | 12-04-2008 | Location 5 | jevans@mail.com | 565 656 6565 |
| Doe, Jon | 4754 00** **** 1234 | 4754 00** **** 1234 | 11-21-2008 | 12-23-2008 | Location 4 | jdoe@mail.com | 899 564 5352 |
| Doe, Janet | 4754 00** **** 1234 | 4754 00** **** 1234 | 11-03-2008 | 12-05-2008 | Location 12 | jdoe2@mail.com | 308 565 6363 |
| Jones, Brad | 4754 00** **** 1234 | 4754 00** **** 1234 | 11-06-2008 | 12-08-2008 | Location 12 | bjones@mail.com | 605 232 4555 |
| Smith, Dave | 4754 00** **** 1234 | 4754 00** **** 1234 | 12-10-2008 | 01-12-2009 | Location 3 | dsmith@mail.com | 208 656 3333 |
| Jones, Craig | 4754 00** **** 1234 | 4754 00** **** 1234 | 11-24-2008 | 12-31-2008 | Location 5 | Cjones@mail.com | 891 659 3214 |
| Lerner, Alex | 4754 00** **** 1234 | 4754 00** **** 1234 | 12-04-2008 | 01-07-2009 | Location 65 | Alerner@mail.com | 970 562 9632 |
| Smith, Matt | 4754 00** **** 1234 | 4754 00** **** 1234 | 11-24-2008 | 12-31-2008 | Location 2 | Msmith@mail.com | 973 703 3654 |
| Morton, Craig | 4754 00** **** 1234 | 4754 00** **** 1234 | 12-08-2008 | 01-12-2009 | Location11 | Cmorton@mail.co | 444 363 2365 |
| Plummer, Jake | 4754 00** **** 1234 | 4754 00** **** 1234 | 12-12-2008 | 01-13-2009 | Location 15 | Jplummer@mail.c | 445 365 9632 |
| Cutler, Jay | 4754 00** **** 1234 | 4754 00** **** 1234 | 12-12-2008 | 01-13-2009 | Location 20 | Jcutler@mail.com | 333 333 3333 |
| Davis, Terrel | 4754 00** **** 1234 | 4754 00** **** 1234 | 12-08-2008 | 01-12-2009 | Location 25 | Tdavis@mail.com | 236 698 6325 |

Total Records: 14

RETURN PAYMENT CARD PROCESS

CROSS-REFERENCE TO RELATED APPLICATIONS

This application claims the benefit of U.S. Provisional Application Ser. No. 61/237,179 entitled "Return Payment Card Process" by Brett Vasten filed Aug. 26, 2009. Priority of the filing date is hereby claimed, and the disclosure of the Provisional Application is hereby incorporated by reference.

BACKGROUND

A variety of portable consumer devices, typically called payment cards, can be purchased by a first entity (the "card purchaser" or "card source") for the benefit of a second entity (the "cardholder") and loaded with a desired amount of money thereon. The card is associated with a cardholder account against which the cardholder can accumulate charges from purchase transactions and make payments. The card purchaser can then have the payment card mailed to the cardholder. Such payment cards are often referred to as prepaid cards or debit cards. In a company-sponsored program, the card purchaser may be the employer of the cardholder. Credit cards are another well-known form of payment card, comprising portable consumer devices that can be used for payment. Credit cards are associated with a cardholder account against which the cardholder can accumulate charges from purchase transactions and make payments.

Conventionally, these payment cards are mailed to the respective cardholder via regular mail, such as through the U.S. Postal Service so the cards are physically received by the cardholder. If the cardholder changes his or her mailing address before receipt, the mailed payment card may not reach the cardholder and instead may be returned by the Postal Service due to the old or invalid mailing address. The sender (i.e., card source) to whom the payment card is returned may comprise the issuing bank, the payment card company, the cardholder's employer, or some other card administration system associated with the payment card.

When a payment card is returned, the card number associated with the payment card is entered into data records of a card processing system. The system determines if the payment card that has been returned is an upgraded card (i.e., a card that is pending activation). If so, the system will force the activation of the upgraded card and then it will change the payment card status to "Returned". The returned payment card is kept for a time to await re-sending or, eventually, to be destroyed. The activation of the upgraded card forces the status of the payment card currently in possession of the cardholder to be "inactive". Because the cardholder's current payment card is not active anymore, that payment card can no longer be used. That is, at approximately the moment the cardholder's current payment card is set to "inactive", that card cannot be used. Such a situation can be a great inconvenience to the cardholder and may occur with no warning. A similar situation exists for cards associated with new accounts, though the results are not as severe, because the inactive status occurs before the cardholder obtains possession of a payment card.

In addition, returned payment cards cause a large overhead because of the need to securely store the returned payment cards pending resolution of their status before they are destroyed. The payment cards must be retrieved from the secure storage to be re-mailed to an updated mailing address or to be destroyed. Moreover, it can be difficult to have prompt communication between the cardholder and the card source or card administration system as to when a payment card has been returned and what the updated mailing address data should be, further complicating the re-mailing process and delaying when the destruction of returned payment cards may take place.

What is needed is an improved technique for handling returned payment cards to reduce inconvenience to cardholders, reduce overhead to card sources, and ensure continued service with current cardholder information.

SUMMARY

A payment card returned to a card source as undeliverable is processed by a card administration system that responds to the return of the payment card by setting a returned flag in a data record associated with an account of a cardholder to whom the payment card was intended for delivery, and otherwise maintaining the cardholder's account status as active. Thus, the status of the payment card currently in the possession of the cardholder is unchanged. A card handling system can initiate destruction of the returned payment card without delay. The card handling system provides a replacement card to the cardholder if updated profile information of the cardholder is received within a predetermined time period, and closes the cardholder account and returns any funds in the cardholder account if no updated profile information of the cardholder is received within the predetermined time period. Thus, the cardholder is not inconvenienced by inactivation without warning and the card source is not forced to store returned cards.

The processing described herein will allow an issuer or other source of the payment card to configure their program such that when an upgraded or replacement card is marked as returned, it will not affect the current payment card in the possession of the cardholder. All other returned payment card processing may remain unchanged from current practice.

Additionally, in a company program, effort is made to alert both the cardholder and the employer that the cardholder profile needs to be updated with a valid mailing address. This is accomplished via a new report and new e-mail messaging. Finally, a new configuration parameter allows new card numbers to be generated for re-mailed replacement cards. This will allow the Issuer to eliminate the storage controls for returned payment cards.

Other objects and advantages of the present invention will be apparent to one of ordinary skill in the art upon review of the detailed description of the present invention and the included figures.

DETAILED DESCRIPTION

As used herein, the term "card" or "payment card" includes, but is not limited to, for example, credit or debit cards, bank cards, prepaid, preloaded, or prefunded cards, such as general purpose reloadable cards, travel cards, payroll cards, teen or student cards, commercial cards, gift cards, or any other type of preloaded, prefunded, or prepaid conventional payment card that a customer can use in lieu of a cash payment, and these terms are used interchangeably herein. Such cards are examples of portable consumer devices which may also include phones, key fobs, personal digital assistants, pagers, smart media, transponders, and other suitable devices. The term "transaction" includes, but is not limited to, bill pay, point-of-service purchase, ATM withdrawal, balance inquiry, or any other purchase-type activity through payment card usage. The term "cardholder" includes, but is not limited to, for example, a cardholder of any type of payment card (as that term is used herein), a customer, or an account holder, and these terms are used interchangeably herein. The term "acquirer" includes, but is not limited to, the merchant's payment processor or the merchant's bank or financial institution who acquires transactions from merchants and routes messages, authorizations, or clearing drafts between merchants and a payment card processing network, and these terms are used interchangeably herein. The term "issuer" includes but is not limited to a bank or other financial institution that issues the payment cards. The term "processing network" or "network" includes but is not limited to an electronic payment system, or any conventional network or system for authorizing or processing electronic payments.

Figure 1:
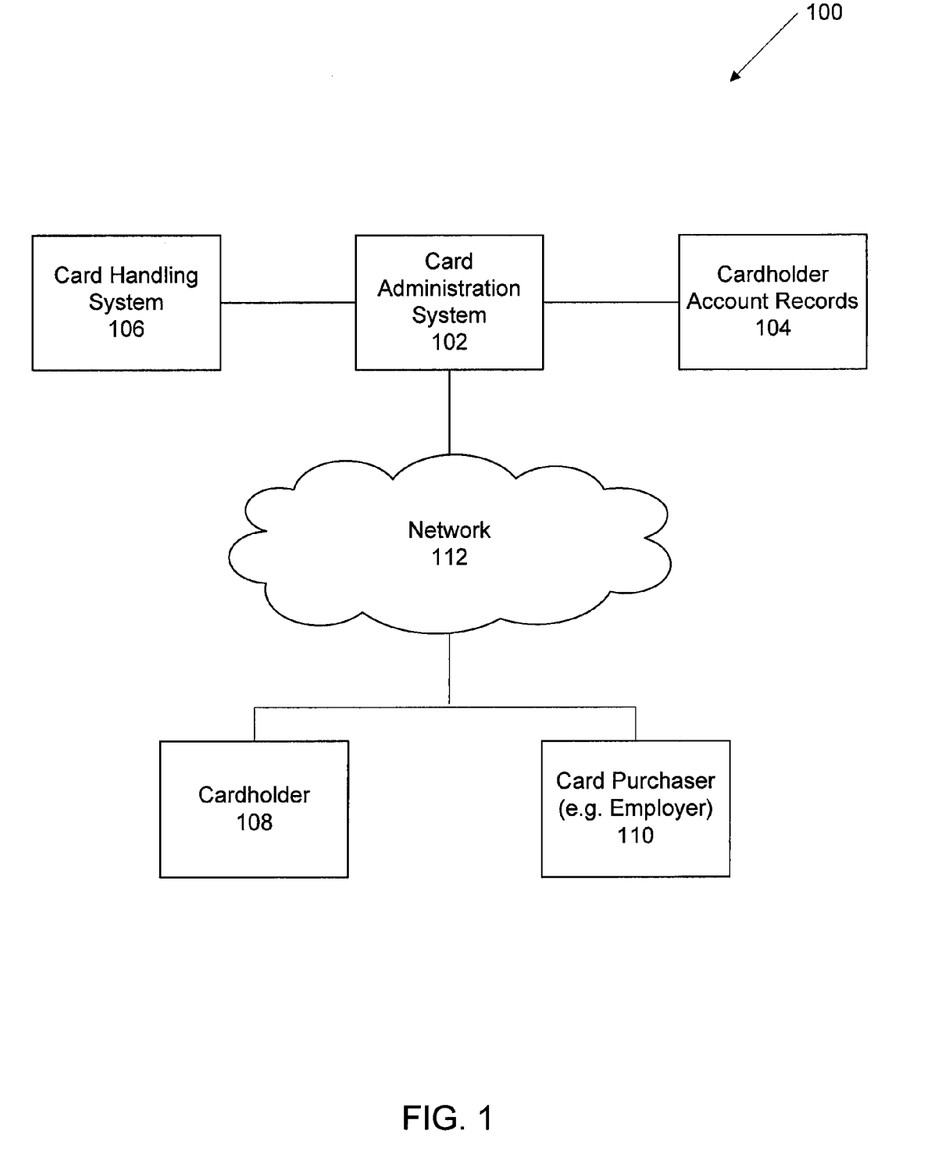
FIG. 1 is a block diagram of an exemplary system that performs the processing described herein for the handling returned payment cards.

FIG. 1 is a block diagram that shows a prepaid returned card processing system 100 having a card administration system 102 that includes computer equipment for authorized system users to carry out the processing described herein. The system users can access data records 104 of cardholder accounts to determine cardholder address information, card status, and the like. The card administration system users can communicate with a card handling system 106 that performs tasks associated with mailing payment cards to cardholders as well as destroying mailed payment cards that have been returned as undeliverable, and corresponding data updates. Once a payment card is returned as undeliverable, a notification of the return can be sent from the card administration system 102 to the cardholder associated with the returned payment card to request updated mailing address information. If desired, the notification can also be sent to the card purchaser 110, such as the cardholder's employer, to alert them of the returned card and of the need for updated cardholder information. The communications between the card administration system 102 and the cardholder 108 and card purchaser 110 can take place over a computer network, such as via e-mail systems over the Internet. The card administration system can be provided and maintained by the issuer or other card source, who is responsible for maintaining a current balance on the payment card and interfacing with merchants and others who accept the payment card as payment for goods and services.

Figure 4:
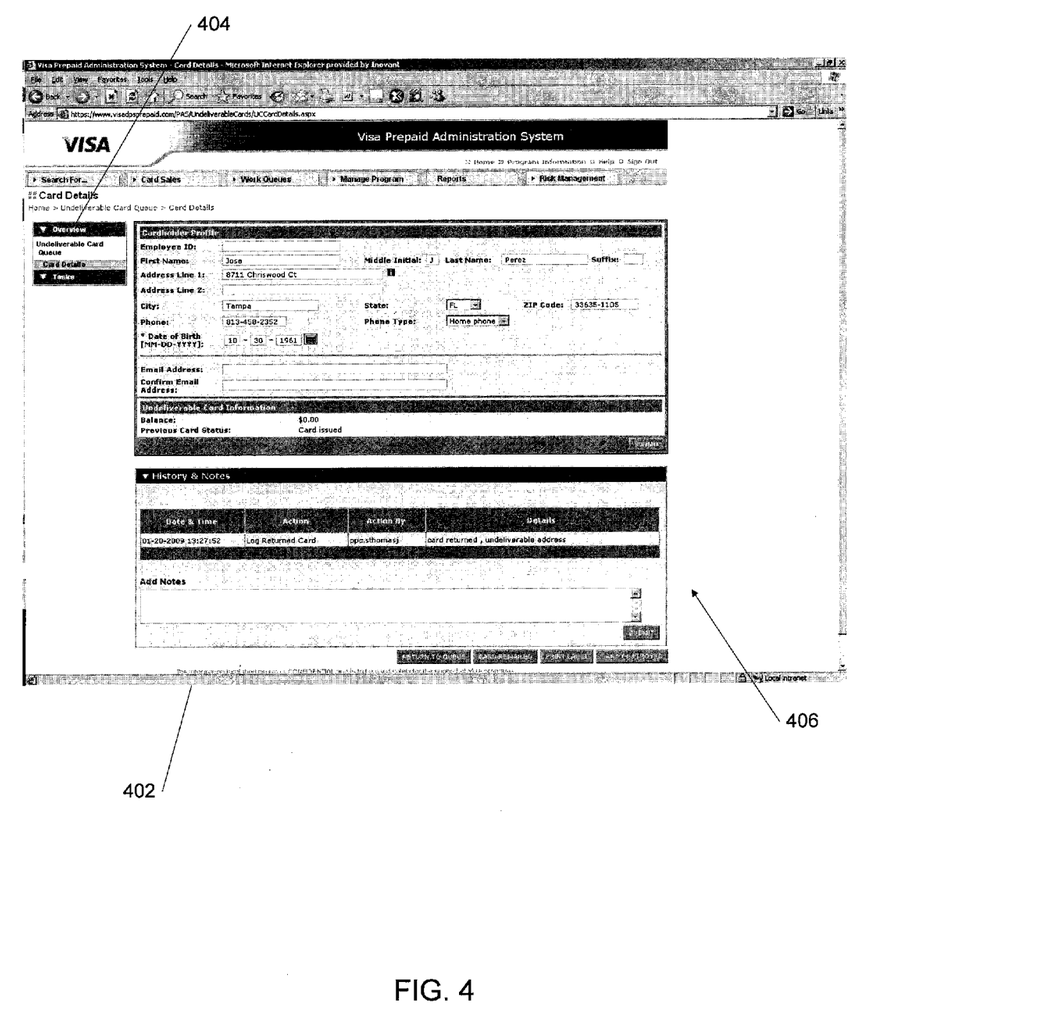
FIG. 4 is a screenshot from a computer display of the FIG. 1 system, showing a data record for a cardholder.

The card administration system 102 may be used by an authorized customer service representative of the issuer or card source in viewing information related to a cardholder's account and maintaining associated data. In one example, the card administration system 102 can comprise one or more computers with software applications configured to provide various graphical user interfaces, display screens, and controls for a person such as a customer service representative to access cardholder account information. The card administration system software may be configured to communicate, via a network if desired, with one or more cardholder account databases 104, which maintain and store account information for a plurality of cardholders. For example, when a cardholder contacts an authorized customer service representative of the issuer (e.g., via telephone), the customer service representative accesses the cardholder's account information via the card administration system 102 and can view one or more cardholder profile display screens as desired. One example of a cardholder profile screen is illustrated in FIG. 4, described further below.

The card administration system 102 may be configured to provide the authorized customer service representative with the ability to input data or associate information with the cardholder's account. The card administration system may also include one or more controls, which may be utilized by the authorized customer service representative order to display profile screens, input data, or perform other functions that may be desired depending upon the particular implementation. In one example, information entered by the authorized customer service representative relating to a cardholder's account is transmitted by the card administration system 102 to the account databases 104, where such information can be stored.

The card administration system 102 may also be accessible, for example in a limited nature, by individuals such as persons (e.g., mail room personnel of the card source or issuer) that handle returned mail such as returned payment cards received from the postal service. In one example, the card administration system 102 can include one or more computer graphical user interfaces for use by individuals such as mail room personnel, when handling returned payment cards. For instance, one or more controls may be provided that permit mail room personnel, upon receipt of a returned payment card that has been marked "return to sender", to set the value of a data flag or indicator associated with a cardholder account indicating that the payment card was returned due to an invalid mailing address. The card administration system 102 may provide a user interface with an address entry field for entry of any forwarding address indicated on the returned payment card mail package. Other status flags or indicators can be used, such as a returned flag of a data record indicating that the cardholder address associated with the account is an old/incorrect/bad/invalid address.

The card administration system 102 may communicate with the card handling system 106, which may be implemented as a list, database, or other data structure. The card handling system can be configured to assist in managing the handling of returned payment cards for destruction, and may perform one or more additional operations described herein, depending upon the implementation. In particular, returned payment cards are not kept in secure storage, rather, they are processed for destruction immediately upon receipt. When an authorized user enters a payment card number as returned, the system 102 sets a returned flag in a data record associated with an account of a cardholder to whom the payment card was intended for delivery. The system otherwise maintains the cardholder's account status as active. Thus, the status of the payment card currently in the possession of the cardholder is unchanged, and the system will not affect use of the payment card currently in the possession of the cardholder. That is, unlike conventional returned card processing systems, the returned card will not be immediately activated and the card in the possession of the cardholder will not be immediately deactivated by the system described herein. Most all other returned payment card processing of conventional systems will remain intact, except as noted herein.

Exemplary Components

Figure 2:
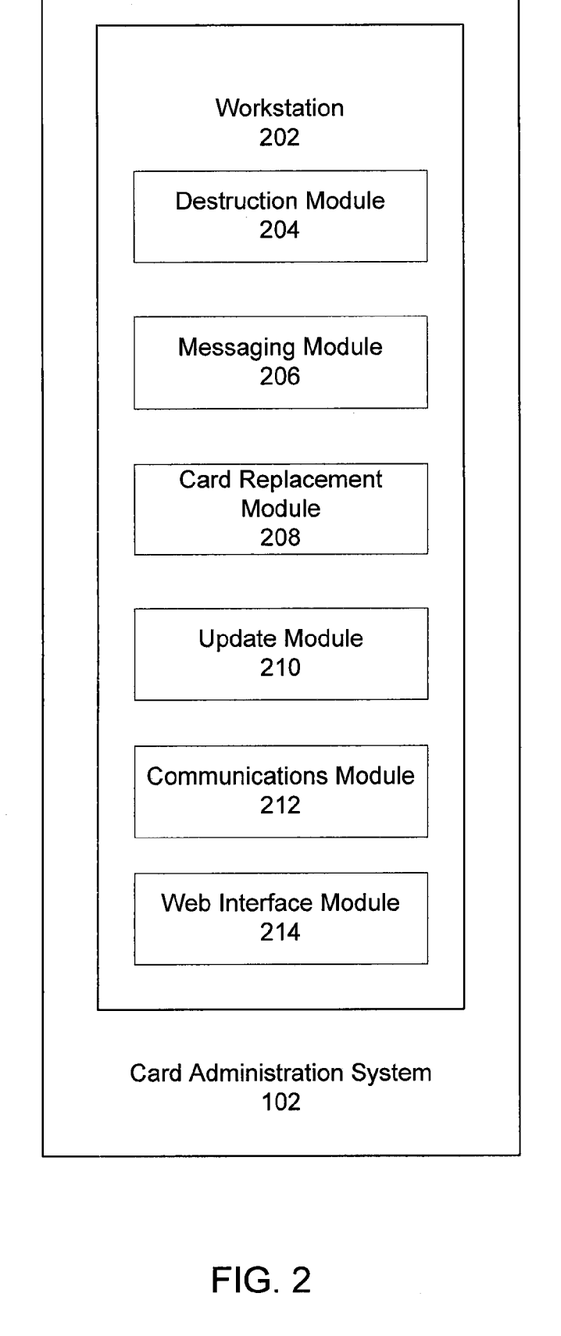
FIG. 2 is a block diagram that shows components of the card administration system of FIG. 1.

FIG. 2 is a block diagram that shows components of the card administration system 102 of FIG. 1. The card administration system may include data processing subsystems, networks, and operations used to support and deliver payment card services, card destruction services, messaging services, data update services, and payment card replacement services. FIG. 2 shows the card administration system 102 as including a workstation computer 202. The workstation computer is typically a desktop computer, a laptop computer, a large mainframe computer, or a cluster of computers that function as a unit. In one example, the workstation computer 202 may be a database server coupled to a Web server. The workstation computer 202 also may comprise a desktop computer used by an authorized person to communicate with a server computer, wherein the desktop computer and server computer have a similar construction as illustrated in FIG. 2 and are both part of the card administration system 102.

The workstation computer 202 may include programming code for causing a processor of the computer to implement a method comprising (a) receiving a card number at a computer of a card administration system for a returned payment card comprising a payment card that was intended for use in connection with a cardholder account having a current payment card, (b) determining that the card number of the returned payment card is associated with an upgrade card or a replacement card in a card database of the card administration system, (c) setting a "returned" indicator of a data record for the returned payment card in the card database of the card administration system and indicating that the returned payment card is to be destroyed, and maintaining a status of the current payment card in the card database without change, and (d) generating data for producing a return-replacement payment card associated with the cardholder account if updated profile information of the cardholder account is received at the computer of the card administration system within a predetermined time period, and closing the cardholder account and returning any funds in the cardholder account if no updated profile information of the cardholder account is received within the predetermined time period.

The returned indicator may comprise a flag that is set or not set, to indicate that a card has been returned as undeliverable, or has not been returned. The "returned" flag may comprise, for example, an additional column in a list or table of a data record for a cardholder account or payment card. A "returned" flag value of zero can be the default value, which is set to "1" or a non-zero value to indicate the corresponding payment card has been returned. Implementing the "returned" flag as an additional column of a data table provides the additional functionality described herein with minimal change to data structures of the system 102 and facilitates leaving the payment card status unchanged even when the card is returned.

The workstation computer 202 of FIG. 2 may also include programming code to implement a method further comprising determining that the cardholder account indicates that the cardholder account is associated with both an upgrade card having a set "returned" flag and a replacement card having a set "returned" flag, wherein generating data for producing a return-replacement payment card comprises generating data for producing a return-replacement payment card only for the upgrade card and not for the replacement card.

The workstation computer 202 of FIG. 2 may also include programming code that comprises a variety of functional modules. The functional modules may comprise a destruction module 204, a messaging module 206, a card replacement module 208, an update module 210, a communications module 212, and a Web interface module 214. Each of these modules may comprise any suitable combination of hardware and/or software to perform the functions described herein.

The workstation computer 202 of FIG. 2 includes programming code that implements a destruction module 204 that initiates processing for destruction of a returned payment card. The destruction processing may include, for example, sending a notification message to personnel to request or authorize physical destruction of a returned payment card. The destruction processing also may include sending a message to confirm that destruction has taken place, and/or initiating a database update for records to reflect the destruction.

The workstation computer 202 of FIG. 2 includes programming code that implements a messaging module 206 that generates and processes messages for the cardholder and/or purchaser relating to the returned payment card. For example, the messaging module facilitates sending a notification message to a cardholder at the cardholder address for the cardholder account as to the returned status of the returned payment card. The notification message may include a request to the cardholder for updated cardholder information, such as residence address, email address, and/or correspondence address. The messaging module 206 can also facilitate sending a notification message to a purchaser at a purchaser address for the returned payment card or other designated notification address to provide information as to the returned status of the returned payment card. The messaging module 206 may be configured to send notification messages in the form of SMS messages, text messages, e-mail messages, automated voice messages, and the like to the cardholder and/or card purchaser.

The workstation computer 202 of FIG. 2 includes programming code that implements a card replacement module 208 that facilitates generating data for producing a return-replacement payment card associated with the cardholder account in response to receiving updated profile information of the cardholder account within a predetermined time period. The card replacement module operates to ensure that the generated data includes a card number for the return-replacement card that is different from the card number of the returned payment card. Ensuring that returned payment cards are destroyed and ensuring that replacement cards have different numbers from the destroyed cards helps reduce incidents of fraud and improves record keeping for the system 102.

The workstation computer 202 of FIG. 2 includes programming code that implements an update module 210 that facilitates updating an account database of the card administration system to reflect the card number for the return-replacement card as having been sent and to reflect the destroyed status of the returned payment card. The update module 210 may be configured to process update information received and/or input from the system user and/or from the cardholder and/or from the payment card purchaser, such as updated cardholder information, cardholder status information, payment card purchaser information, account information, and the like. The update information may be received and may be stored in the database of the cardholder account records 104 and the card handling system 106.

The workstation computer 202 of FIG. 2 includes programming code that implements a communications module 212 that facilitates communication between the workstation computer and other components of the system 100. For example, the communications module can provide necessary interfaces for network communications with the database of the cardholder account records 104 and the card handling system 106, if those components are implemented separately from the workstation computer 202. The card administration database of the cardholder account records 104 and the card handling system 106 may alternatively be implemented as modules comprising programming code of the card administration system 102 that provides the operations of the database of the cardholder account records 104 and the card handling system 106 as described herein.

The database of the cardholder account records 104 and the card handling system 106 may store any suitable type of information to facilitate performance of the operations described herein. Suitable information that may be stored in the database system 104, 106 may include cardholder name and address information, payment card purchaser (e.g. employer) name and address information, payment card status information, and cardholder account information. Other information that may be included in the database 104, 106 may include other operational and maintenance information for the system 100.

The workstation computer 202 of FIG. 2 includes programming code that implements a Web interface module 214 that facilitates operation with a Web site, through which operations such as data update, messaging, card replacement authorization, and destruction processing may be initiated, authorized, and controlled. The drawings described further below include an exemplary Web site display window screen shot as provided through the Web interface module 214. The Web interface module may comprise, for example, a Web browser and Web site maintenance applications. In addition, the Web interface module may be used by a system user to provide updated information to the system, and may be used by a system user to initiate or acknowledge messaging, as well as initiate and authorize payment card processing operations.

Thus, the workstation and programming code of the workstation computer 202 enable operation of the card administration system 102 such that, when an authorized user of the system enters the returned payment card number into an application interface for programming code executing on the workstation, a server computer 202 of the card administration system 102 detects whether the card being returned is an upgraded card or a replacement card (i.e., a card that is pending activation). If the returned payment card is an upgraded card or a replacement card, then the server computer will set the value of a data flag or indicator associated with a cardholder account to indicate that the payment card was returned. Other processing may apply to a payment card that is not an upgraded card or replacement card. Thus, for an upgraded card or replacement card that has been returned as undeliverable, the system 102 will not change the status of the payment card in the possession of the cardholder, and therefore the cardholder is not inconvenienced by deactivation without warning.

The workstation and programming code of the workstation computer 202 also will enable operation of the card administration system 102 to facilitate issuer configuration of the payment cards produced under their payment card program such that when an upgraded payment card is designated by a flag indicator as "returned", that designation will not affect the use of the current payment card that is in the possession of the cardholder. All other returned payment card processing can remain unchanged from conventional practice. In addition, both the cardholder and the card purchaser (e.g. the cardholder employer) can be alerted via message notification that the cardholder profile data needs to be updated with a valid account address and the like. The message notification can be sent via postal mail, or e-mail, or both, or via other messaging techniques, and reports can be issued within the card administration system to reflect such notifications and updated information. Lastly, the card administration system 102 can include a configuration parameter that will allow new card numbers to be generated for re-mailed replacement payment cards. This will allow the issuer to eliminate storage controls for returned payment cards. Card numbers may be identical to account numbers, in which case the generated new card numbers will initiate new account number processing.

Exemplary Operations

Figure 3:
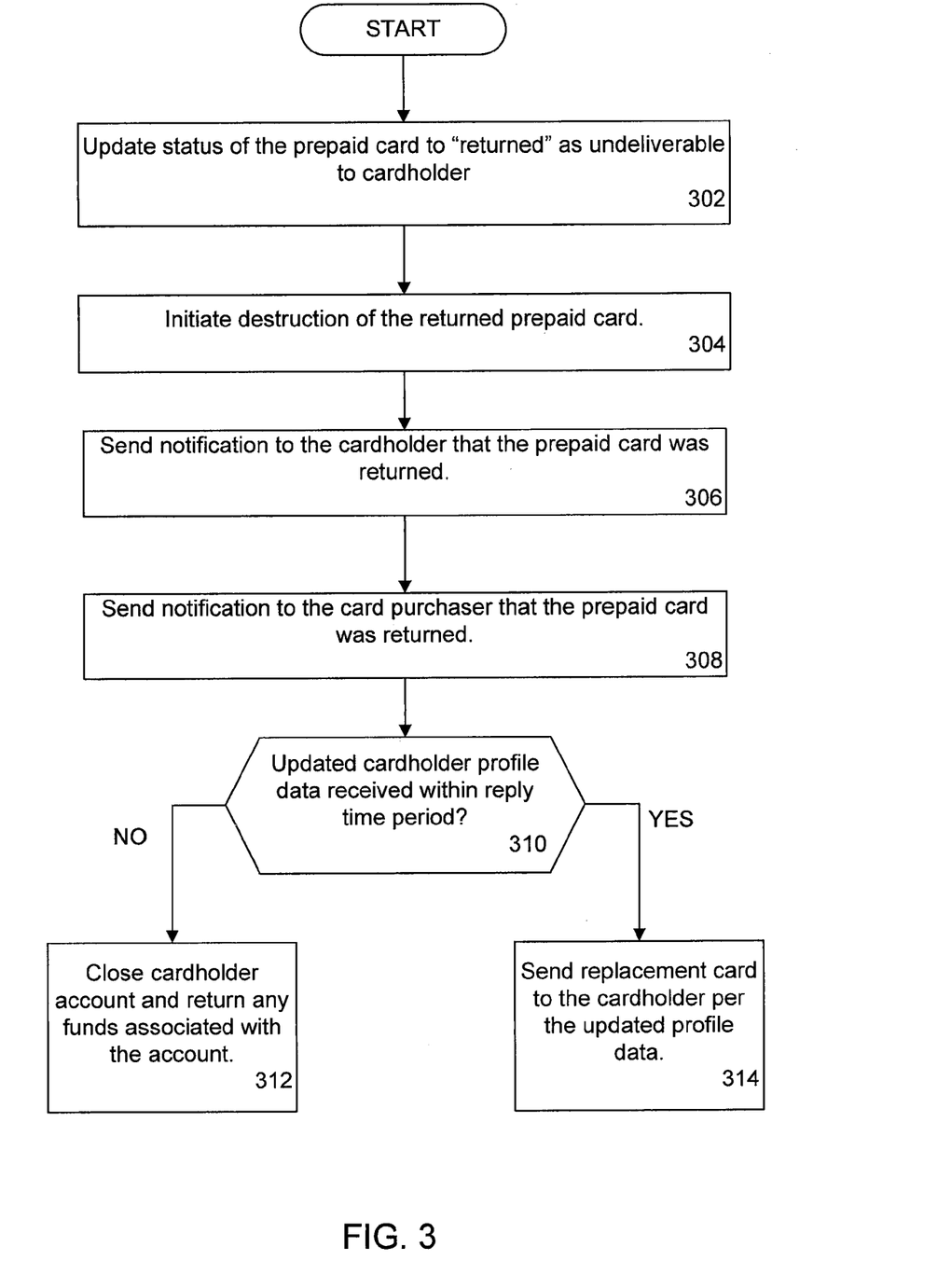
FIG. 3 is a flow diagram that illustrates the processing performed by the card administration system of FIG. 1.

FIG. 3 shows the operations performed by the card administration system of FIG. 1. At the first operation, corresponding to box 302 of FIG. 3, the system receives an indication that the payment card has been returned as undeliverable to the mailing address of record for the cardholder and sets a "returned" flag. The returned indication can be received as a result of an update operation comprising data entry by an authorized user of the card administration system 102 through the Web interface module 214 described above. As part of this operation 302, the card administration system can respond to the "returned" indication by changing the value of a "returned" flag in a data record associated with the payment card to have a value that indicates the "returned" situation. This operation 302 does not affect the status of the current payment card. That is, no change is made to the card status value of the data record associated with the current payment card, which is presumably still in the possession of the cardholder.

More particularly, in accordance with operation of the card administration system 102, a payment card is associated with a data record for a cardholder account having a status value set to either "active" (in the case of a payment card last known to be in possession of the cardholder), or "destroyed" or "closed" (for a returned payment card for which no updated cardholder information has been received within a predetermined time limit). In the illustrated embodiment, the "returned" flag is a data value that is separate from the status value of a cardholder account such that the "returned" flag and account status value can be changed independently of each other.

At the next operation, box 304, the card administration system initiates destruction processing of the returned payment card. This operation results in physical destruction of the returned payment card. This operation may include data operations such as internal notifications or authorizations for immediate destruction of the returned payment card. As noted previously, the immediate destruction of a returned payment card reduces returned-card expenses, such as overhead for secure vault storage of returned payment cards pending their disposition.

Next, at box 306, the card administration system sends a notification message to the cardholder to inform the cardholder that the sent payment card was returned as undeliverable to the mailing address of record. The fact that the payment card was returned by the Postal Service indicates that the mailing address to which the payment card was sent is invalid or otherwise not correct. Therefore, the notification message should be sent by means other than mailing to the mailing address of record. For example, the card administration system may send the notification message as an e-mail message to an e-mail address in the database 104 for the cardholder. Other forms of notification messaging, such as a text message or telephone call, may be used. The notification message will request updated mailing address information for the cardholder, to update the profile data of the cardholder and for sending of a replacement card to substitute for the returned and destroyed payment card. In addition, the system may send a similar notification of the returned card to the card purchaser at box 308. For example, the payment card might have been obtained through the employer of the cardholder. In that case, the card administration system would also send a notification message to the cardholder's employer, as a second path of communication and request for updated cardholder mailing address information.

After the notification messages have been sent at 306, 308, the card administration system waits for a predetermined amount of time at box 310 to receive the updated cardholder mailing address information. If no updated information is received within the reply period, a negative outcome at box 310, then at box 312 the system closes the cardholder account and returns any remaining prepaid funds associated with the account. If the updated mailing address information is received within the reply period, an affirmative outcome at box 310, then at box 314 the system sends a replacement card to the cardholder, at the corrected cardholder mailing address in the updated profile data.

Thus, the card administration system processes returned payment cards in an efficient manner without delay, in particular for processing upgrade or replacement payment cards. The processing described herein begins when the card administration system receives an undeliverable, returned payment card as a result of the return address provided on the envelope in which the payment card was sent for mail delivery. Typically, an authorized user of the card administration system opens the returned envelope and enters the card number of the returned payment card into the computer application of the card administration system. The card administration system can recognize if the card number is an upgrade or replacement payment card. The system can accommodate a data record for a cardholder that indicates both types of returned payment cards, a returned upgrade card and a returned replacement card. That is, the system will update the data records corresponding to each type of returned payment card in question. In accordance with the processing of FIG. 3, for a returned upgrade or replacement payment card, the system does not activate the returned payment card. Instead, an appropriate "returned flag" value is set in a data record of the cardholder account database indicating that the replacement or upgraded payment card has been returned as undeliverable.

In response to the data indicating that the card was returned as undeliverable, the card administration system will maintain the "returned" flag indicator or similar data value for the data record of the returned payment card until either the address is updated in the application program so that a replacement payment card can be produced and mailed, or until a predetermined time has elapsed since the card was returned without receiving an update. The predetermined time may be, for example, a number of days calculated to allow for receipt of the updated information into the system. Once the predetermined time has elapsed and no update information has been received, the system will close the cardholder account and will change the data record of the returned payment card from its current status to "destroyed" status or closed status, depending on system implementation of status categories.

When the "returned" flag is initially set, the card administration system will generate a report from the computer application to reflect the cardholder information as outdated, so that the cardholder profile can be updated. Additionally, an e-mail message will be sent to both the cardholder and the card purchaser (employer) contact, requesting updated address information for the cardholder profile data of the card administration system.

As noted above, system processing can include closing the cardholder account if no updated cardholder address information is received within a reply period. The returned payment card can relate to a primary account, or a secondary account. For example, a parent might have a primary account card and a dependent of the parent might have a secondary account card. If the returned payment card is for the primary account, then closing the account for lack of updated information will result in closing both the primary account and the secondary account. If the returned payment card is for the secondary account, then closing the account for lack of updated information will not result in closing the primary account, but may result in closing only the secondary account.

The computers of the card administration system may provide user interfaces through software applications to enable system users to enter data and update records as needed. FIG. 4 is a screenshot 402 from a computer window display of the FIG. 1 system. The screenshot relates to cards that have been returned and are awaiting updated cardholder information, which are maintained in a list comprising an "Undeliverable Card" queue, as depicted under the "Overview" heading 404 of FIG. 4. The main window 406 of FIG. 4 shows a data record for a cardholder in the Undeliverable Card queue. The main window 406 shows that the system may maintain a variety of profile data for a cardholder, such as cardholder profile data including cardholder name, address, telephone, and email address. These data records help facilitate communication with the cardholder in the event of a card return. Also shown in FIG. 4 are items such as undeliverable card information relating to prepaid balance and previous card status, and history and notes relating to returned status and card history. The system also may maintain corresponding data for the card purchaser.

Figure 5:
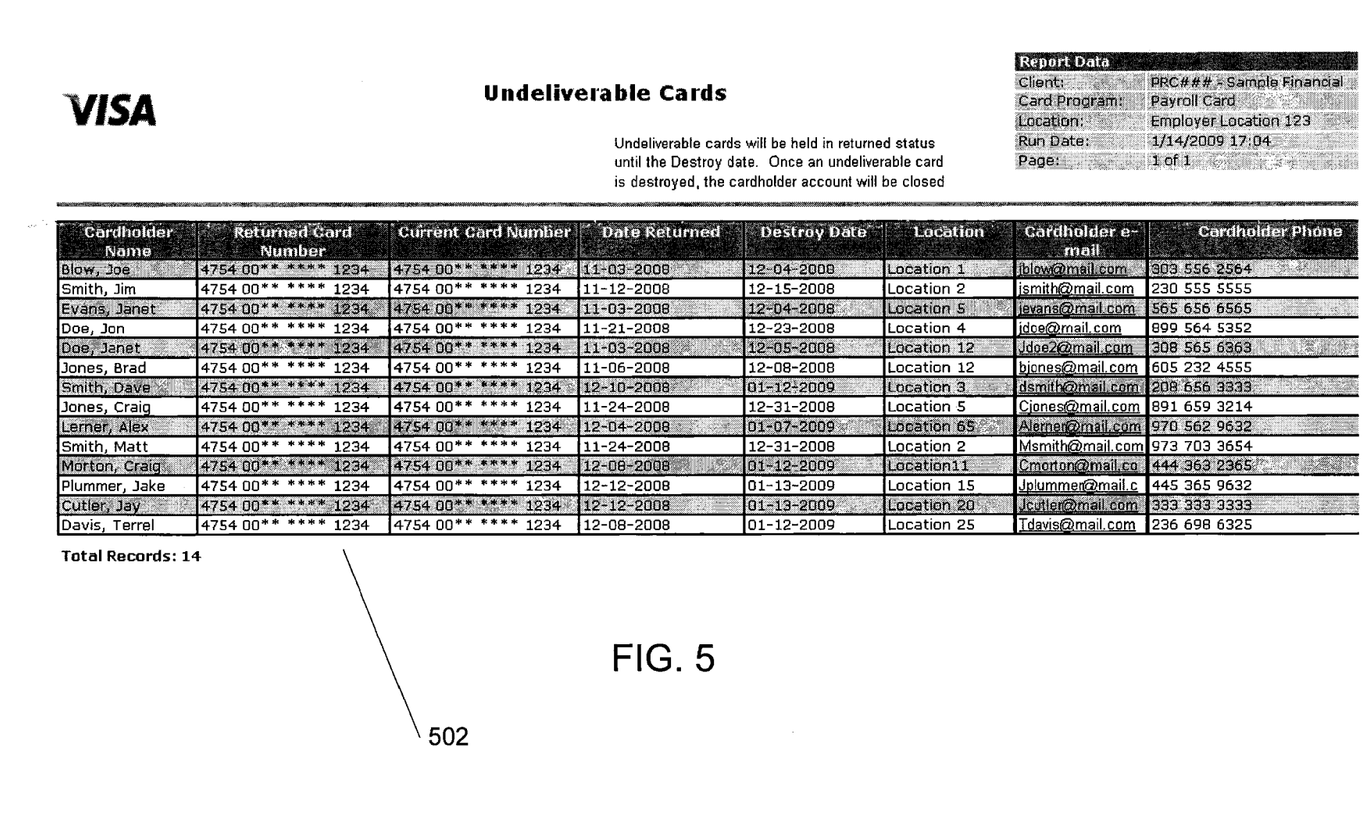
FIG. 5 is a screenshot from a computer display of the FIG. 1 system, showing a user interface for data records of returned payment cards.

The user interface of the card administration system may also enable system users to manage data of the returned payment cards. FIG. 5 is a screenshot 502 from a computer monitor display of the FIG. 1 system, showing a data record for returned payment cards in which returned cards are listed in the rows down the display with corresponding information noted in the columns across the display. The screenshot shows information for each returned payment card, such as cardholder name, returned card number, current card number, data on which the returned card was received, destroy date, physical location of the card, cardholder e-mail address, and cardholder telephone. Such information facilitates managing the status of the cardholder account and communicating with the cardholder.

Exemplary Computer Device

Figure 6:
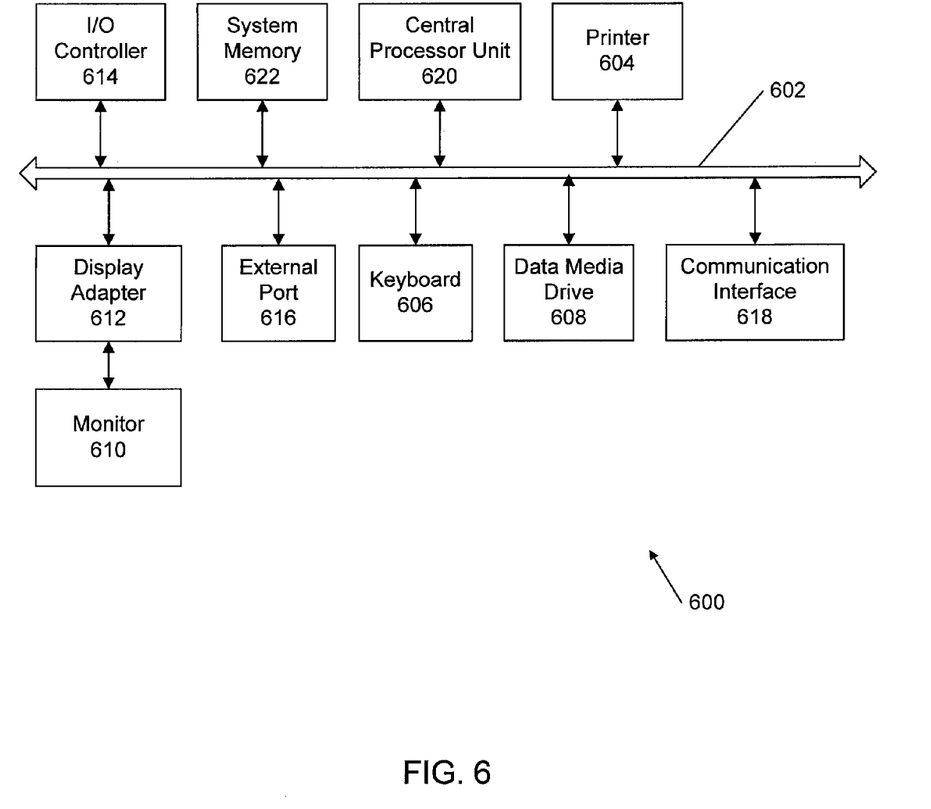
FIG. 6 is a block diagram of a computer apparatus in the card administration system of FIG. 1.

FIG. 6 is a block diagram of a computer device in the card administration system of FIG. 1. The various components illustrated in FIG. 1 may be implemented in one or more computer devices (e.g., a workstation computer) to facilitate and perform the functions described herein. Any of the components illustrated in FIG. 1 may use any suitable number of devices or subsystems to facilitate and perform the functions described herein. Examples of such devices or subsystems are shown in the computer system 600 of FIG. 6.

The devices and subsystems shown in FIG. 6 are interconnected via a system bus 602. Additional subsystems such as a printer 604, a keyboard 606, a data media drive 608, a display monitor 610, which is coupled to a display adapter 612, and others are shown. The data media drive 608 may comprise, for example, a hard disk drive (HDD), a flash memory device, a magnetic drive, or an optical disk drive that receives a removable computer-readable medium such as a data disk. Peripherals and input/output (I/O) devices, which are coupled to an I/O controller 614, can be connected to the computer system 600 by any number of means known in the art, such as an external port 616. For example, the external port 616 may comprise a serial port or a Universal Serial Bus (USB) for connection with a mouse input device, an optical scanner, or an external data store. Alternative data devices may be connected to the computer system 600 via the communication interface 618. The communication interface can be used for a variety of data connections, such as a connection to a wide area network or a local area network via an infrared connection or a "WiFi" or "Bluetooth" wireless connection, and the like.

The interconnection of the various devices and subsystems via the system bus 602 allows the central processor unit (CPU) 620 to communicate with each of the devices and subsystems, and to control the execution of programming instructions received from the system memory 622 or from the data media drive 608 or from a removable or external data store via the communication interface 618, as well as to control the exchange of information between the devices and subsystems.

Embodiments of the invention may be used by payment card companies, issuers such as Banks, processors that handle various aspects of payment card transactions, or other entities. Embodiments of the present invention could be used with any type of payment card, depending on the implementation, including but not limited to credit card, debit cards, payment cards, reloadable cards, bank cards, or the like.

Embodiments of the invention can be implemented via appropriate software or computer program code instructions in combination with appropriate instruction execution platforms, processor(s), hardware or the like. These instructions may be in the form of a computer program product that can cause a CPU to control operation of a card administration system according to an embodiment of the invention. The combination of hardware and software to perform the functions described can form the means to carry out the processes and/or subprocesses of embodiments of the invention. In this regard, each block in the flowcharts or block diagrams may represent a module, segment, action, or portion of code, which comprises one or more executable instructions or actions for implementing the specified logical function(s). Furthermore, an embodiment of the invention may take the form of a hardware embodiment, a software embodiment (including firmware, resident software, micro-code, etc.) or an embodiment combining software and hardware aspects.

Any suitable computer usable or computer readable medium may be used, taking into account that computer program code to operate a card administration system according to embodiments of the invention may reside at various places. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out embodiments of the present invention may be written in an object oriented, scripted or unscripted programming language such as but not limited to Java, Perl, Smalltalk, C++ or the like. However, the computer program code for carrying out embodiments of the present invention may also be written in conventional procedural programming languages, such as the "C" programming language or similar programming languages. It should also be noted that functions and combination of functions described herein can be implemented by special purpose hardware-based systems or operators which perform the specified functions or acts.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operation is not a limitation of the present invention.

It should be appreciated that reference throughout this specification to "one embodiment" or "an embodiment" or "one example" or "an example" means that a particular feature, structure or characteristic described in connection with the embodiment, may be included, if desired, in at least one embodiment of the present invention. Therefore, it should be appreciated that two or more references to "an embodiment" or "one embodiment" or "alternative embodiment" or "one example" or "an example" in various portions of this specification are not necessarily all referring to the same embodiment. Furthermore, the particular features, structures or characteristics may be combined as desired in one or more embodiments of the invention.

What is claimed is:

1. A computer method comprising:
receiving a card number, at a computer of a card administration system, for a returned payment card associated with a cardholder account of a cardholder, the cardholder account having a current payment card;
determining, by the computer, that the card number of the returned payment card is associated with an upgrade card or a replacement card in a card database of the card administration system for use in connection with the cardholder account;
setting, by the computer, a "returned" indicator of a data record for the returned payment card in the card database of the card administration system and initiating physical destruction of the returned payment card in response to the card administration system receiving the card number for the returned payment card without delay, and maintaining a status of the current payment card in the card database without change;
subsequent to initiating physical destruction of the returned payment card, determining, by the computer, whether updated profile information of the cardholder is received within a predetermined time period;
when the updated profile information of the cardholder is determined to be received at the computer of the card administration system within the predetermined time period:
updating a profile of the cardholder with the updated profile information;
generating, by the computer, data for producing a return-replacement payment card associated with the cardholder account; and causing the return-replacement payment card to be sent to a location based on the updated profile information; and when no updated profile information of the cardholder is determined to be received at the computer of the card administration system within the predetermined time period:
closing the cardholder account;
updating the data record for the returned payment card in the card database of the card administration system to indicate a closed status; and
returning any funds in the cardholder account.

2. The computer method as in claim 1, further including:
sending a notification message to a cardholder address for the cardholder account as to the returned status of the returned payment card.

3. The computer method as in claim 1, further including:
sending a notification message to a purchaser address for a purchaser of the returned payment card as to the returned status of the returned payment card.

4. The computer method as in claim 1, wherein the generated data for producing the return-replacement card includes a card number for the return-replacement card that is different from the card number of the returned payment card.

5. The computer method as in claim 4, further including updating an account database of the card administration system to reflect the card number for the return-replacement card as having been sent and to reflect the destroyed status of the returned payment card.

6. The computer method as in claim 1, further including determining that the cardholder account indicates that the cardholder account is associated with both an upgrade card having a status of "returned" and a replacement card having a status of "returned", wherein generating data for producing a return-replacement payment card comprises generating data for producing a return-replacement payment card only for the upgrade card and not for the replacement card.

7. The computer method of claim 1, further comprising:
determining whether the returned payment card is an upgraded card or a replacement card, wherein the generated data for producing the return-replacement payment card includes a new card number when the returned payment card is determined to be a replacement card.

8. The computer method of claim 1, wherein initiating physical destruction of the returned payment card without delay includes processing the returned payment card for destruction without performing a determination as to whether to destruct the returned payment card.

9. A system comprising:
one or more processors; and
a memory coupled to the one or more processors, the memory encoded with instructions configured to cause the one or more processors to perform operations including:
receiving a card number for a returned payment card associated with a cardholder account of a cardholder, the cardholder account having a current payment card;
determining that the card number of the returned payment card is associated with an upgrade card or a replacement card in a card database of the card administration system for use in connection with the cardholder account;
setting a "returned" indicator of a data record for the returned payment card in the card database of the card administration system and initiating physical destruction of the returned payment card in response to the card administration system receiving the card number for the returned payment card without delay, and maintaining a status of the current payment card in the card database without change;
subsequent to initiating physical destruction of the returned payment card, determining whether updated profile information of the cardholder is received within a predetermined time period;
when the updated profile information of the cardholder is determined to be received at the computer of the card administration system within the predetermined time period:
updating a profile of the cardholder with the updated profile information;
generating data for producing a return-replacement payment card associated with the cardholder account; and
causing the return-replacement payment card to be sent to a location based on the updated profile information; and
when no updated profile information of the cardholder is determined to be received at the computer of the card administration system within the predetermined time period:
closing the cardholder account;
updating the data record for the returned payment card in the card database of the card administration system to indicate a closed status; and
returning any funds in the cardholder account.

10. The system of claim 9, further comprising instructions configured to cause the one or more processors to perform operations including:
sending a notification message to a cardholder address for the cardholder account as to the returned status of the returned payment card.

11. The system of claim 9, further comprising instructions configured to cause the one or more processors to perform operations including:
sending a notification message to a purchaser address for a purchaser of the returned payment card as to the returned status of the returned payment card.

12. The system of claim 9, wherein the generated data for producing the return-replacement card includes a card number for the return-replacement card that is different from the card number of the returned payment card.

13. The system of claim 9, further comprising instructions configured to cause the one or more processors to perform operations including:
updating an account database of the card administration system to reflect the card number for the return-replacement card as having been sent and to reflect the destroyed status of the returned payment card.

14. The system of claim 9, wherein generating data for producing a return-replacement payment card comprises generating data for producing a return-replacement payment card only for the upgrade card and not for the replacement card.

15. A non-transitory computer readable storage medium encoded with program instructions that, when executed, cause one or more processors in an electronic device to execute a method comprising:
receiving a card number for a returned payment card associated with a cardholder account of a cardholder, the cardholder account having a current payment card;
determining that the card number of the returned payment card is associated with an upgrade card or a replacement card in a card database of the card administration system for use in connection with the cardholder account;

setting a "returned" indicator of a data record for the returned payment card in the card database of the card administration system and initiating physical destruction of the returned payment card in response to the card administration system receiving the card number for the returned payment card without delay, and maintaining a status of the current payment card in the card database without change;

subsequent to initiating physical destruction of the returned payment card, determining whether updated profile information of the cardholder is received within a predetermined time period;

when the updated profile information of the cardholder is determined to be received at the computer of the card administration system within the predetermined time period:

updating a profile of the cardholder with the updated profile information;

generating data for producing a return-replacement payment card associated with the cardholder account; and     causing the return-replacement payment card to be sent to a location based on the updated profile information; and when no updated profile information of the cardholder is determined to be received at the computer of the card administration system within the predetermined time period:

closing the cardholder account;

updating the data record for the returned payment card in the card database of the card administration system to indicate a closed status; and     returning any funds in the cardholder account.

16. The computer readable storage medium of claim 15, wherein the method further comprises:

sending a notification message to a cardholder address for the cardholder account as to the returned status of the returned payment card.

17. The computer readable storage medium of claim 15, wherein the method further comprises:

sending a notification message to a purchaser address for a purchaser of the returned payment card as to the returned status of the returned payment card.

18. The computer readable storage medium of claim 15, wherein the generated data for producing the return-replacement card includes a card number for the return-replacement card that is different from the card number of the returned payment card.

19. The computer readable storage medium of claim 15, wherein generating data for producing a return-replacement payment card comprises generating data for producing a return-replacement payment card only for the upgrade card and not for the replacement card.

20. The computer readable storage medium of claim 15, wherein generating data for producing a return-replacement payment card comprises generating data for producing a return-replacement payment card only for the upgrade card and not for the replacement card.

\* \* \* \* \*